Patented Sept. 3, 1940

2,213,864

UNITED STATES PATENT OFFICE 2,213,864

RECOVERY OF COPPER FROM BRASS

Allen C. Jephson, Johnstown, Pa., assignor, by mesne assignments, to Lincoln Niagara Corporation, New York, N. Y., a corporation of New York No Drawing. Application June 2, 1938, Serial No. 211,392

2 Claims. (Cl. 204—106)

This invention relates to the recovery of copper from scrap brass, and consists in a method whereby the desired metal may be recovered in substantially pure condition and with economy. In the practice of the invention scrap brass, in the form of borings, turnings, chips, etc., may be compressed to a coherent body that is of continuous electrical conductivity throughout all its extent. This initial step in the procedure may conveniently be carried out by subjecting the mass of scrap to high pressure within a mold. Alternatively, the scrap may be remelted, to form a solid anode.

An electrolytic cell is then formed, within which the compressed and coherent body of scrap becomes the anode; a plate of iron, conveniently, or other metallic body may be employed as the cathode; and the electrolyte is an alkaline solution, typically a solution of caustic soda. It is desirable to maintain the solution at such degree of concentration that the specific gravity is at least 1.4, and preferably higher. A direct current is employed. The operation of electrolysis goes forward at a temperature preferably of 70° C. or higher.

Under such conditions the anode is gradually dissolved, and free copper in finely divided state released. This copper, insoluble in the electrolyte, settles to the bottom of the cell. This is a reversal of the usual method, in that the more noble metal is recovered from the anode compartment as a powder and the zinc is removed from the system at the cathode. This permits cyclic operation.

The electrolyte is filtered from the copper powder; traces of zinc and other impurities are removed by treating the filtrate with dilute sulphuric acid; the filtrate then is washed free of water-soluble substance; and, finally, the copper powder is freed of moisture and brought to ultimate condition by heating in a non-oxidizing atmosphere. A peak temperature of approximately 200° C. may conveniently be attained in the drying operation.

I claim as my invention:

1. The method herein described of recovering copper from scrap brass which consists in subjecting brass to electrolytic action while serving as a soluble anode in a solution of caustic soda as an electrolyte, whereby copper freed from the state of alloy and insoluble in the electrolyte is precipitated and collects in the bottom of the cell, and separating the copper that so collects.

2. The method herein described of recovering copper from scrap brass which consists in subjecting brass to electrolytic action while serving as a soluble anode in a solution of caustic soda as an electrolyte of a specific gravity not less than 1.4, whereby copper freed from the state of alloy and insoluble in the electrolyte is precipitated and collects in the bottom of the cell, and separating the so collected copper.

ALLEN C. JEPHSON.